(12) United States Patent
Chen

(10) Patent No.: US 11,546,653 B2
(45) Date of Patent: Jan. 3, 2023

(54) DIGITAL BROADCAST RECEIVING DEVICE AND RELATED RECEIVING METHOD

(71) Applicant: Realtek Semiconductor Corp., HsinChu (TW)

(72) Inventor: Chun-Yi Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/319,032

(22) Filed: May 12, 2021

(65) Prior Publication Data

US 2021/0385525 A1 Dec. 9, 2021

Related U.S. Application Data

(60) Provisional application No. 62/704,950, filed on Jun. 4, 2020.

(30) Foreign Application Priority Data

Jan. 5, 2021 (TW) ................................ 110100272

(51) Int. Cl.
*H04N 21/434* (2011.01)
*H04N 21/44* (2011.01)
(Continued)

(52) U.S. Cl.
CPC ......... *H04N 21/4347* (2013.01); *H04N 5/455* (2013.01); *H04N 21/4348* (2013.01); *H04N 21/4383* (2013.01); *H04N 21/44004* (2013.01)

(58) Field of Classification Search
CPC ............. H04N 21/4347; H04N 21/455; H04N 21/4348; H04N 21/4383; H04N 21/44004
(Continued)

(56) References Cited

U.S. PATENT DOCUMENTS 7,562,375 B2    7/2009 Barrett
8,831,121 B1 *  9/2014 Qi ....................... H04L 27/2653
                                          375/260
(Continued)

FOREIGN PATENT DOCUMENTS

CN          1606352 B      5/2013

*Primary Examiner* — Dominic D Saltarelli
(74) *Attorney, Agent, or Firm* — Winston Hsu

(57) ABSTRACT

A digital broadcast receiving device includes a multi-channel tuning device, a first de-multiplexing device, a second de-multiplexing device. The multi-channel tuning device includes a plurality of locking devices, wherein the locking devices are arranged to lock a broadcast signal at a plurality of frequency points, and respectively output a plurality of data streams that correspond to the frequency points. The first de-multiplexing device includes a plurality of first de-multiplexing units, wherein the first de-multiplexing units are respectively associated with one of the locking devices and arranged to respectively buffer data units in the data streams that correspond to specific types. The second de-multiplexing device is coupled to the first de-multiplexing device and includes a plurality of second de-multiplexing units, wherein the second de-multiplexing units are arranged to respectively buffer data units that are buffered by the first de-multiplexing units and correspond to specific channels.

14 Claims, 3 Drawing Sheets

(51) Int. Cl.
*H04N 5/455* (2006.01)
*H04N 21/438* (2011.01)

(58) Field of Classification Search
USPC .................................................. 375/240.26
See application file for complete search history.

(56) References Cited

U.S. PATENT DOCUMENTS

| | | |
|---|---|---|
| 2009/0161025 A1 | 6/2009 | Ward |
| 2013/0136212 A1* | 5/2013 | Shirasuka .......... H04N 21/4383 375/340 |
| 2013/0247089 A1 | 9/2013 | Kummer |
| 2014/0189739 A1* | 7/2014 | Kummer ............ H04N 21/4263 725/40 |
| 2017/0134798 A1* | 5/2017 | Seo ....................... H04N 21/433 |
| 2021/0099752 A1* | 4/2021 | Ruditsky ............ H04N 21/4383 |
| 2021/0127084 A1* | 4/2021 | Uchimura ................ H04N 5/76 |

* cited by examiner

| Time | TL1 | TL2 | TL3 | TL4 | TL5 | TL6 | TL7 | TL8 |
|---|---|---|---|---|---|---|---|---|
| Receiving | PA1 (GOP) | PA2 | PA3 | PA4 | PA5 | PA6 | PA7 | PA8 |
| Buffering | | PA1 | PA2 | PA3 | PA4 | PA5 | PA6 | PA7 |
| Pre-parsing | | PA1 | | | | | | |
| Decoding | | PA1 | PA2 | PA3 | PA4 | PA5 | PA6 | PA7 |

FIG. 3

| Time | TL1 | TL2 | TL3 | TL4 | TL5 | TL6 | TL7 | TL8 |
|---|---|---|---|---|---|---|---|---|
| Receiving | PA1 | PA2 (GOP) | PA3 | PA4 | PA5 | PA6 | PA7 | PA8 |
| Buffering | | PA1 | PA2 | PA3 | PA4 | PA5 | PA6 | PA7 |
| Pre-parsing | | PA1 | PA2 | | | | | |
| Decoding | | | PA2 | PA3 | PA4 | PA5 | PA6 | PA7 |

FIG. 4

DIGITAL BROADCAST RECEIVING DEVICE AND RELATED RECEIVING METHOD

CROSS REFERENCE TO RELATED APPLICATIONS

This application claims the benefit of U.S. Provisional Application No. 62/704,950, filed on Jun. 4, 2020. The entire contents of the related applications are incorporated herein by reference.

BACKGROUND OF THE INVENTION

1. Field of the Invention

The present invention relates to digital broadcasting, and more particularly, to receiving devices and related methods with multiple frequency points locking, de-multiplexing and buffering functions.

2. Description of the Prior Art

Typically, a digital broadcasting receiver receives signals in a wide frequency band (i.e., contents from various broadcasting channels) and accordingly controls a tuner in the receiver in accordance with a channel selected by the user to synchronize with a frequency of the selected channel, thereby to lock the frequency. After the signal is stable, a de-multiplexer in the receiver de-multiplexes data received in the locked signal, and a decoder decodes the data provided by the de-multiplexer to output program content of the selected channel. Once the user switches between channels, the tuner must re-lock according to a corresponding frequency of the channel the user wants to switch. Accordingly, the de-multiplexer and the decoder also need to perform corresponding operations again to reproduce the program content the user wants to watch. Each time the user switches to a new channel, the above process needs to be repeated, which brings a perceivable latency to the user.

SUMMARY OF THE INVENTION

In order to reduce the latency of channel switching and improve user experience, the present invention provides innovative digital broadcast receiver architecture. Specifically, the present invention uses a multi-channel tuning device with multiple frequency point locking capabilities, thereby to simultaneously lock multiple frequency points in a broadcast signal, where the multiple frequency points may correspond to a channel that is currently being watched by the user and several channels that are previously watched before and/or about to be watched later. Therefore, the multi-channel tuning device can pre-lock those channels the user may watch later, thereby pre-obtaining data units corresponding to a variety of channels. In addition, the present invention uses multiple de-multiplexing units to properly filter and de-multiplex the data units. First, data units that are not associated with video/audio information are filtered out through a first set of de-multiplexing units. Second, data units that correspond to different channels are respectively buffered by a second set of de-multiplexing units. Once the user issues a channel switching command, a decoding device can immediately obtain data units of the selected channel through the second set of de-multiplexing units and decode video/audio to reproduce channel contents. In this regards, the latency of channel switching can be effectively alleviated, achieving fast channel change (FCC).

According to one embodiment, a digital broadcast receiving device is provided. The digital broadcast receiving device comprises a multi-channel tuning device, a first de-multiplexing device, a second de-multiplexing device. The multi-channel tuning device includes a plurality of locking devices, wherein the locking devices are configured to lock a broadcast signal at a plurality of frequency points, and output a plurality of data streams corresponding to the frequency points, respectively. The first de-multiplexing device is coupled to the multi-channel tuning device, and includes a plurality of first de-multiplexing units. The plurality of first de-multiplexing units are associated with one of the locking devices, respectively, each configured to respectively buffer data units corresponding to specific types in the data streams. The second de-multiplexing device is coupled to the first de-multiplexing device, and includes a plurality of second de-multiplexing units. The plurality of second de-multiplexing units are configured to respectively buffer data units that correspond to specific channels and are buffered by the plurality of first de-multiplexing units.

According to one embodiment, a digital broadcast receiving method is provided. The digital broadcast receiving method comprises: locking a broadcast signal at a plurality of frequency points, and outputting a plurality of data streams corresponding to the frequency points, respectively; utilizing a plurality of first de-multiplexing units to respectively buffer data units corresponding to specific types in the data streams; and utilizing a plurality of second de-multiplexing units to respectively buffer data units that correspond to specific channels and are buffered by the plurality of first de-multiplexing units.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates an application of digital broadcast receiving device and method of the present invention.

FIG. 4 illustrates another application of digital broadcast receiving device and method of the present invention.

DETAILED DESCRIPTION

In the following, numerous specific details are described to provide a thorough understanding of embodiments of the present invention. However, one of skilled in the art will understand how to implement the present invention in the absence of one or more specific details, or relying on other methods, elements or materials. In other instances, well-known structures, materials or operations are not shown or described in detail in order to avoid obscuring the main concepts of the present invention.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Figure 1:
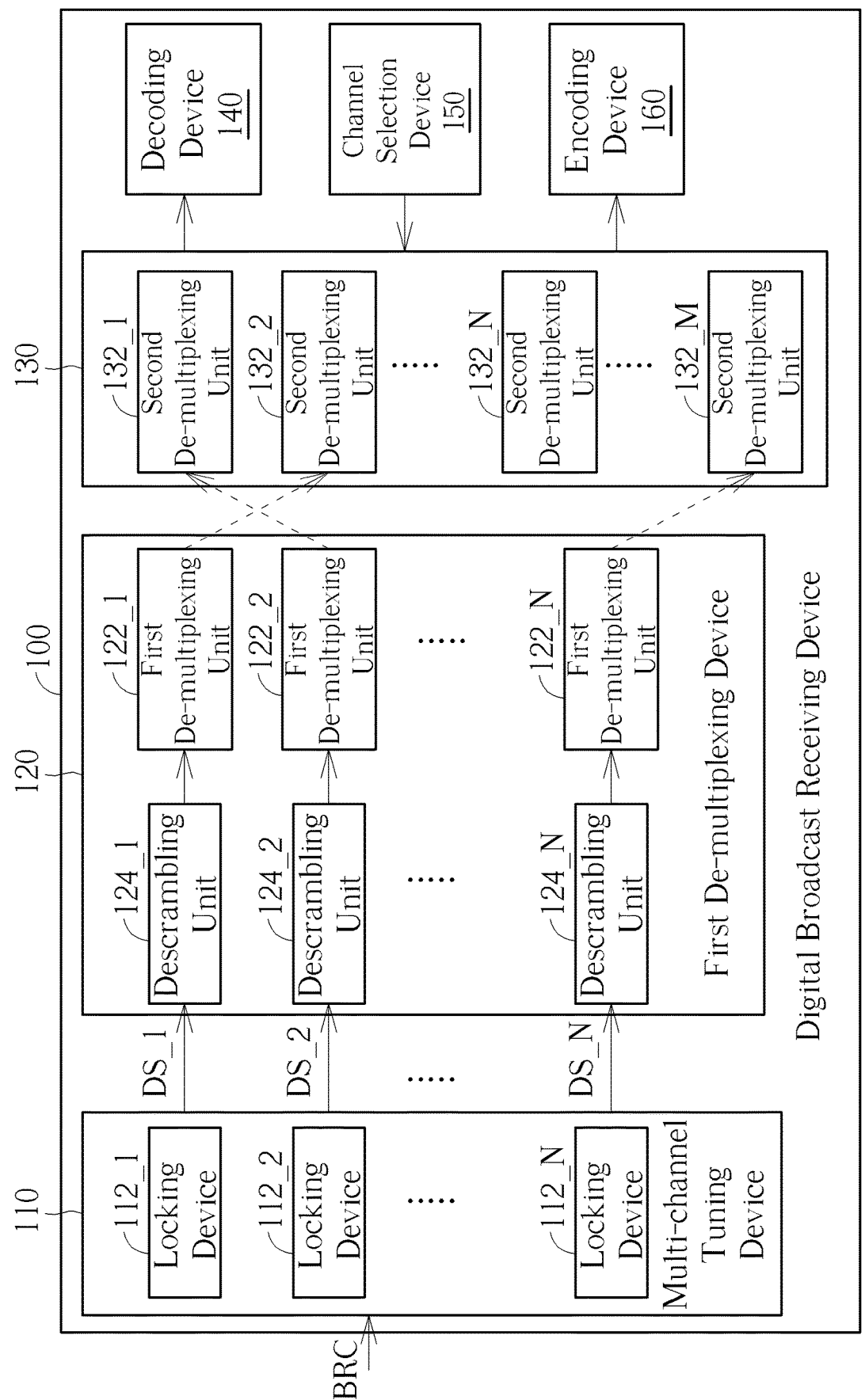
FIG. 1 is a schematic diagram of a digital broadcast receiving device according to one embodiment of the present invention.

Please refer to FIG. 1, which is a schematic diagram of a digital broadcast receiving device according to one embodiment of the present invention. As shown by the figure, a digital broadcast receiving device 100 includes a multi-channel tuning device 110, a first de-multiplexing device 120, a second de-multiplexing device 130, a decoding device 140, and a channel selection device 150. The multi-channel tuning device 110 includes a plurality of locking devices 112_1-112_N. The locking devices 112_1-112_N respectively lock multiple frequency points of a broadcast signal BRC. When locking frequency points, the multi-channel tuning device 110 refers to a channel that is currently being watched by the user, and accordingly determines a plurality of frequency points to be locked according to a table recording relationships between channels and frequencies. Specifically, the multi-channel tuning device 110 not only locks a frequency point corresponding to the channel currently being watched by the user, but also locks frequency points corresponding to predicted viewing channels, such as, a previous channel and a next channel of the currently watched channel. It is also possible to lock frequency points corresponding to several channels previous to and/or next to the currently watched channel. Alternatively, a channel switching prediction algorithm can be applied to predict channels the user may watch later based on recorded user's viewing habits, thereby locking frequency points corresponding to the predicted viewing channels. The number of frequency points that the multi-channel tuning device 110 can lock at the same time depends on the number of locking devices 112_1-112_N of the multi-channel tuning device 110. According to various embodiments of the present invention, the number of locking devices 112_1-112_N may be different.

The locking devices 112_1-112_N of the multi-channel tuning device 110 will lock the broadcast signal BRC at different frequency points, thereby obtaining data streams DS_1-DS_N corresponding to the locked frequency points. Please note that, although it is not explicitly presented in the figure, the multi-channel tuning device 110 may also include other circuit components, such as demodulators, analog-to-digital converters, which demodulates the locked signal and performs analog-to-digital conversion thereon, so as to output the data streams DS_1-DS_N corresponding to different frequency points. The data streams DS_1-DS_N on the multiple channels outputted by the multi-channel tuning device 110 will be sent to the first de-multiplexing device 120 for de-multiplexing and buffering.

The first de-multiplexing device 120 includes first de-multiplexing units 122_1-122_N. Each of the data streams DS_1-DS_N outputted by the locking devices 110_1-110_N locking the frequencies will be inputted to a corresponding one of the first de-multiplexing units 122_1-122_N for buffering. In an initial stage, the first de-multiplexing units 122_1-122_N will be set to buffer data units (such as packets) corresponding to all channels in each of data stream BS_1-BS_N. For example, the first de-multiplexing unit 122_1 is set to buffer the data stream DS_1, and the data stream DS_1 may contain data units corresponding to program contents of three different channels. In the initial stage, the data units corresponding to the program contents of these three channels are all buffered by the first de-multiplexing unit 122_1. Furthermore, the first de-multiplexing units 122_1-122_N will discard data units that do not belong to specific types, such as data units that are not associated with video/audio information. In one embodiment, the first de-multiplexing units 122_1-122_N may discard the data units of types corresponding to emergency broadcasting, system information, and/or electronic program guide (EPG). Such operation is implemented by verifying identification components (e.g., packet identifier, PID) in the data units.

In a following stage, the first de-multiplexing units 122_1-122_N will respectively buffer the data streams DS_1-DS_N more specifically. For example, the first de-multiplexing unit 122_1 may only buffer the data units corresponding to the program content of a specific channel among the three different channels. The channel selection device 150 will determine a previous channel and a next channel corresponding to a current channel that is being watched by the user, or several previous and next channels corresponding to the currently watched channel. Alternatively, based on a channel switching prediction algorithm, multiple predicted viewing channels can be determined. Associations between the predicted viewing channels and the second de-multiplexing units 132_1-132_M in the second de-multiplexing device 130 will be found. That is, it will be found that a data unit of a certain channel is buffered in which second de-multiplexing unit 132_1-132_M. Accordingly, the second de-multiplexing units 132_1-132_M set the first de-multiplexing units 122_1-122_N, and the first de-multiplexing units 122_1-122_N are instructed to stop buffering data units of channels that are no longer required by the channel selection device 150. Therefore, in the following stage, the first de-multiplexing units 122_1-122_N only reserve data units of a specific channel on a certain frequency point.

On the other hand, the first de-multiplexing device 140 may further include descrambling units 124_1-124_N. If the data streams DS_1-DS_N are scrambled when generated at the transmitting end, the descrambling units 124_1-124_N of the first de-multiplexing device 120 can descramble the data streams DS_1-DS_N, such that the first de-multiplexing units 122_1-122_N will buffer the descrambled data units. In one embodiment, the second de-multiplexing units 132_1-132_N perform parsing operations on the data units. If the data units are found to be scrambled, it will set the descrambling units 124_1-124_N to perform descrambling processing. However, the descrambling processing could be optional, and the descrambling processing for the data streams DS_1-DS_N can also be completed by the second de-multiplexing units 132_1-132_N. If the data stream DS_1-DS_N is not scrambled, the descrambling units 124_1-124_N do not need to perform the descrambling processing on the data units.

The number of the second de-multiplexing units 132_1-132_M in the second de-multiplexing device 130 may be greater than or equal to the number of first de-multiplexing units 122_1-122_N. For example, if each of the data streams DS_1-DS_N contains three channels of program contents, the number of second de-multiplexing units 132_1-132_M can be N*3. However, this is not a limitation of the present invention, and the number of the second de-multiplexing units 132_1-132_M can be changed to meet different requirements. Moreover, in one embodiment, the second de-multiplexing units 132_1-132_M can be implemented by software. The second de-multiplexing units 132_1-132_M can further buffer the data units that is previously buffer by the first de-multiplexing units 122_1-122_N, identify the data units buffered in the first de-multiplexing units 122_1-

122_N, and reserve or discard the data units according to their types. For example, the second de-multiplexing unit 132_1 can identify a type of the data unit according to an identification component included in the data unit, thereby to choose to reserve only the data unit associated with a specific channel. Alternatively, in the following stage of operations of the first de-multiplexing device 120, the first de-multiplexing units 122_1-122_N can be set to only reserve data units that are associated with a specific channel. In addition, the second de-multiplexing units 132_1-132_M may also descramble the data units buffered by the first de-multiplexing units 122_1-122_N. However, the descrambling processing is optional. If the descrambling units 124_1-124_N in the first de-multiplexing device 120 have already performed the descrambling processing on the data streams DS_1-DS_N, then the second de-multiplexing units 132_1-132_M do not need to perform the descrambling processing again, or if the data streams DS_1-DS_N are not scrambled, the second de-multiplexing units 132_1-132_M also do not need to perform the descrambling processing.

Through cooperative operations of the above-mentioned multi-channel tuning device 110, the first de-multiplexing device 120, and the second de-multiplexing device 130, the second de-multiplexing units 132_1-132_M not only buffer data units of a channel that is currently being watched by the user, but also buffer data units of one or more channels that are previously watched by the user, and data units of one or more channels that are likely to be watched by the user later. Therefore, once the user switches to a new channel, the channel selection device 150 will find out the predicted viewing channels that are previously determined. According to associations between these predicted viewing channels and the second de-multiplexing units 132_1-132_M, the channel selection device 150 finds out that the data units of the selected channel are buffered in which second de-multiplexing units 132_1-132_M. The decoding device 140 is allowed to decode the buffered data unit to reproduce video/audio frames of the selected channel. In this way, the multi-channel tuning device 110, the first de-multiplexing device 120, and the second de-multiplexing device 130 do not need to relock the frequency point, de-multiplex and buffer the data units again, which greatly reduces the latency. On the other hand, if data units of a new channel that the user intends to switch is not in the second de-multiplexing unit 132_1-132_M, then one of the locking devices 112_1-112_N in the multi-channel tuning device 110 will be used to re-lock a corresponding frequency point of the new channel, and the first de-multiplexing unit 122_1-122_N will buffer the data units of the new channel.

In an embodiment, the digital broadcast receiving device 100 of the present invention may further include an encoding device 160. The encoding device 160 can encode data units buffered in the second de-multiplexing units 132_1-132_M, so as to record program contents of specific channels. Since the multi-channel tuning device 110 of the present invention can lock different frequency points at the same time, the encoding device 160 is able to simultaneously record program contents of different channels existing on different frequency points. However, this is not possible for conventional digital broadcast receiving devices. This is because the conventional digital broadcast receiving devices only lock the broadcast signals at one frequency point, and thus it cannot record program contents of different channels existing on different frequency points.

Figure 2:
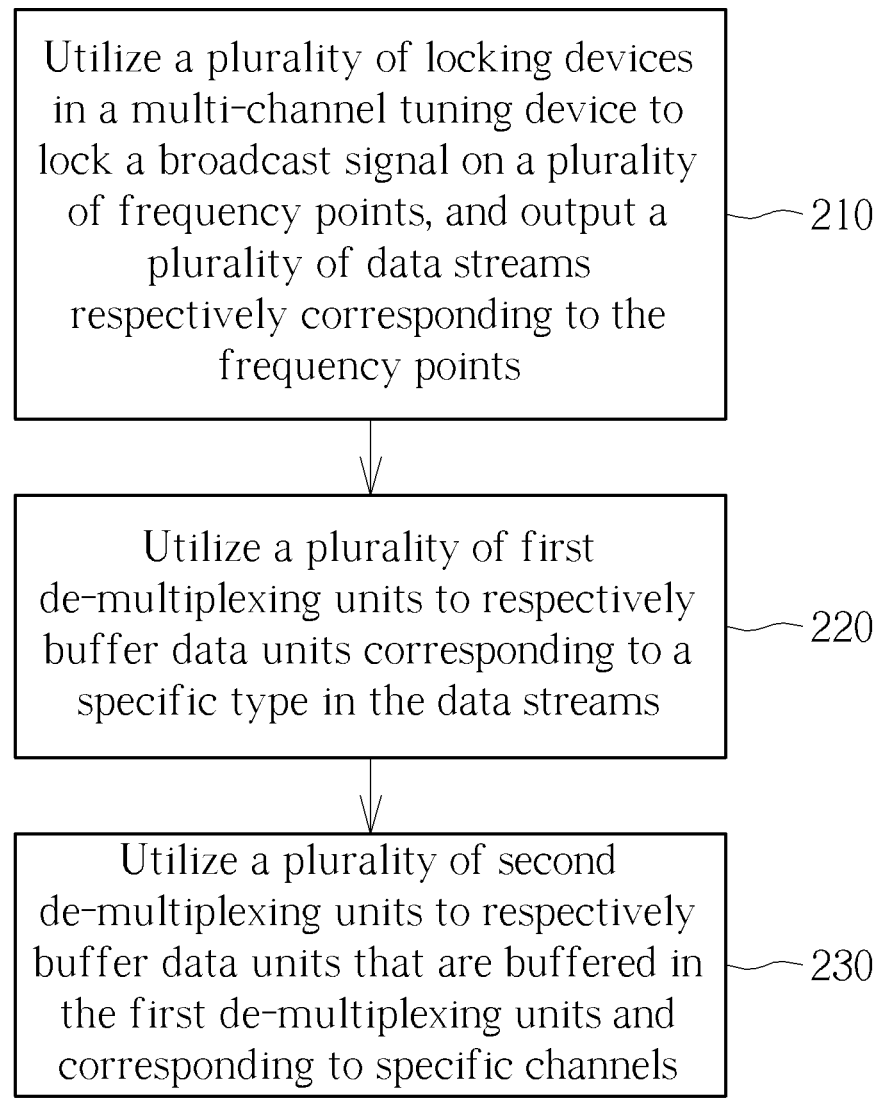
FIG. 2 is a flowchart of a digital broadcast receiving method according to one embodiment of the present invention.

Please refer to FIG. 2 which illustrates a flow chart of a digital broadcast receiving method according to one embodiment of the present invention. The flow includes the following steps:

Step 210: Utilize a plurality of locking devices in a multi-channel tuning device to lock a broadcast signal on a plurality of frequency points, and output a plurality of data streams respectively corresponding to the frequency points Step 220: Utilize a plurality of first de-multiplexing units to respectively buffer data units corresponding to a specific type in the data streams Step 230: Utilize a plurality of second de-multiplexing units to respectively buffer data units that are buffered in the first de-multiplexing units and corresponding to specific channels.

Since principles, operations, and alternative implementations of the above steps are detailed in the descriptions regarding the digital broadcast receiving device, repeated descriptions are not omitted here. Those who are familiar with the technical field of the present invention should be able to implement the digital broadcasting method provided by the present invention based on the above steps after fully understanding the foregoing descriptions.

According to one embodiment of the present invention, the second de-multiplexing units 132_1-132_M can perform a pre-parsing operation on the buffered data units to determine whether one or more data units contain video/audio information required by the decoding device 140. Once a buffered data unit does not contain video/audio information required by the decoding device 140, the first de-multiplexing device 120 and the second de-multiplexing device 130 may be also instructed to discard the buffered data unit, so as to avoid wasting the time and the hardware resources of the decoding device 14 in processing non-video/non-audio information. In one embodiment, the second de-multiplexing units 132_1-132_M determine whether a payload of a data unit contains video/audio information required by the decoding device 140 in accordance with a header of the data unit. For example, when the header of the data unit is associated with a frame type of the payload in group of pictures (GOP) structure, it means that the data unit contains the video/audio information required by the decoding device 140.

Please refer to FIG. 3. In an embodiment shown by FIG. 3, it is assumed that a first data unit PA1 in the data stream contains I-frame of a GOP structure. I-frame represents a reference image of intra coded pictures, and each GOP starts with this type of frame. Ina first time slot TL1, the multi-channel tuning device 110 receives the data unit PA1. In a second time slot TL2, the data unit PA1 is buffered by a first de-multiplexing unit 122_K of the first de-multiplexing device 120. Meanwhile, a second de-multiplexing unit 132_K of the second de-multiplexing device 130 performs a pre-parsing operation on the data unit PA1. According to the header of the data unit PA1, it is found that the data unit PA1 contains I-frame of the GOP structure. Therefore, it can be confirmed that the data unit PA1 contains video/audio information required by the decoding device 140. In view of this, the data unit PA1 will be buffered and later decoded by the decoding device 140. Once confirming that the data unit PA1 contains video data, the second de-multiplexing unit 130_K may not need to perform the pre-parsing operation the following data units. This is because frames of the GOP structure have the continuity. Data units following the data unit PA1 still contain other frames of the GOP structure, such as, I-frame, B-frame, and/or P-frame. Therefore, after the data units PA2-PA8 are received by the multi-channel tuning device 110, these data units will be all reserved in the second de-multiplexing unit 130_K, waiting for being decoded by the decoding device 140.

In an embodiment shown by FIG. 4, a data unit PA1 does not include I-frame of the GOP structure, while a second data unit PA2 includes I-frame of the GOP structure. In a first time slot TL1, the multi-channel tuning device 110 receives the data unit PA1. In a second time slot TL2, the data unit PA1 is buffered by a first de-multiplexing unit 122_K of the first de-multiplexing device 120. Meanwhile, a second de-multiplexing unit 132_K of the second de-multiplexing device 130 performs a pre-parsing operation on the data unit PA1. According to the header of the data unit PA1, it is found that the data unit PA1 does not contain I-frame of the GOP structure. In other words, the data unit PA1 does not contain video information. Therefore, the second de-multiplexing unit 132_K discards the data unit PA1, allowing the decoding device 140 not to decode the data unit PA1. Furthermore, the data unit PA2 received in the time slot TL2 will be buffered by the first de-multiplexing unit 122_K in time slot TL3, and pre-parsed by the second de-multiplexing unit 132_K immediately. According to the header of the data unit PA2, the second de-multiplexing unit 132_K determines that the data unit PA2 contains I-frame of the GOP structure, and therefore confirms that the data unit PA2 contains video/audio information required by the decoding device 140. In view of this, the data unit PA2 will be reserved and wait for being decoded by the decoding device 140.

In summary, the present invention provides innovative digital broadcast receiving device architecture. Specifically, the multi-channel tuning device 110 can simultaneously lock multiple frequency points in a broadcast signal, so as to extract data units corresponding to a channel that is currently being watched as well as channels that are likely to be watched later. In addition, the data units are properly filtered and de-multiplexed through multiple de-multiplexing units. First, through the first de-multiplexing units 122_1-122_N, the data units that are not associated with video/audio information are filtered out. Through the second de-multiplexing units 132_1-132_N, the data units corresponding to different channels are buffered respectively. After that, once the user issues a channel switching instruction, the decoding device 140 can quickly obtain data units of a corresponding channel from the second de-multiplexing units 132_1-132_N, and accordingly decode the audio and video the data units, thereby to reproduce program contents. In this regard, the latency of channel switching can be effectively reduced, achieving fast channel switching.

Embodiments of the present invention can be implemented using hardware, software, firmware, and/or combinations thereof. Through an appropriate instruction execution system, embodiments of the present invention can be implemented using software or firmware stored in a memory. In terms of hardware, embodiments of the present invention can be implemented using any of the following technologies or a combination thereof: a separate logic having a logic gate capable of performing a logic function according to a data signal, and an application specific integrated circuit (ASIC), a programmable gate array (PGA), or a field programmable gate array (FPGA) having suitable combinational logics.

Flowcharts and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital broadcast receiving device, comprising:
   a multi-channel tuning device including a plurality of locking devices, wherein the locking devices are configured to lock a broadcast signal at a plurality of frequency points, and output a plurality of data streams corresponding to the frequency points, respectively;
   a first de-multiplexing device coupled to the multi-channel tuning device, including a plurality of first de-multiplexing units, wherein the first de-multiplexing units are associated with one of the locking devices, respectively, each configured to respectively buffer data units corresponding to specific types in the data streams; and
   a second de-multiplexing device coupled to the first de-multiplexing device, including a plurality of second de-multiplexing units, wherein the second de-multiplexing units are configured to respectively buffer data units that correspond to specific channels and are buffered by the first de-multiplexing units, and the specific channels comprise a current channel being watched by a user, a previous channel and a next channel corresponding to the current channel;
   wherein the first de-multiplexing units are configured to respectively buffer data units corresponding to all channels in the data streams during a first period of time, and the second de-multiplexing units are configured to set the first de-multiplexing units to buffer data units corresponding to specific channels in the data streams during a second period of time after a new channel is selected by the user.

2. The digital broadcast receiving device of claim 1, wherein only when data units in the data streams belong to video or audio types, the first de-multiplexing units buffer the data units.

3. The digital broadcast receiving device of claim 1, wherein the first de-multiplexing units do not buffer data units belonging to emergency broadcasting, system information, and electronic program guide types.

4. The digital broadcast receiving device of claim 1, wherein the first de-multiplexing device further includes a plurality of descrambling units, and the second de-multiplexing units respectively parse data units that are buffered by the first de-multiplexing unit; when one of the data units is found to be scrambled, the second de-multiplexing units set the descrambling units in the first de-multiplexing device to descramble the data units in the data streams.

5. The digital broadcast receiving device of claim 1, wherein the digital broadcast receiving device further includes a decoding device, and the decoding device can decode data units that are buffered by one of the second de-multiplexing units, thereby to produce video and audio frames corresponding to program contents of a first channel.

6. The digital broadcast receiving device of claim 5, wherein the digital broadcast receiving device further includes at least one encoding device, and the encoding device can encode data units that are buffered by at least one of the second de-multiplexing units, thereby to record program contents of a second channel.

7. The digital broadcast receiving device of claim 6, wherein the first channel and the second channel correspond to different frequency points of the broadcast signal.

8. A digital broadcast receiving method, comprising:
  locking a broadcast signal at a plurality of frequency points, and outputting a plurality of data streams corresponding to the frequency points, respectively;
  utilizing a plurality of first de-multiplexing units to respectively buffer data units corresponding to specific types in the data streams;
  utilizing a plurality of second de-multiplexing units to respectively buffer data units that correspond to specific channels and are buffered by the first de-multiplexing units, and the specific channels comprise a current channel being watched by a user, a previous channel and a next channel corresponding to the current channel;
  utilizing the first de-multiplexing units to respectively buffer data units corresponding to all channels in the data streams during a first period of time; and
  utilizing the second de-multiplexing units to set the first de-multiplexing units to respectively buffer data units corresponding to specific channels in the data streams during a second period of time after a new channel is selected by the user.

9. The digital broadcast receiving method of claim 8, wherein the step of utilizing the first de-multiplexing units to buffer the data units comprises:
  only when data units in the data streams belong to video or audio types, utilizing the first de-multiplexing units to buffer the data units.

10. The digital broadcast receiving method of claim 8, wherein the step of utilizing the first de-multiplexing units to buffer the data units comprises:
  not utilizing the first de-multiplexing units to buffer data units belonging to emergency broadcasting, system information, and electronic program guide types.

11. The digital broadcast receiving method of claim 8, further comprising:
  utilizing the second de-multiplexing units to respectively parse data units that are buffered by the first de-multiplexing unit;
  when one of the data units is found to be scrambled, utilizing a plurality of descrambling units to descramble the data units in the data streams.

12. The digital broadcast receiving method of claim 8, further comprising:
  decoding data units that are buffered by one of the second de-multiplexing units, thereby to produce video and audio frames corresponding to program contents of a first channel.

13. The digital broadcast receiving method of claim 12, further comprising:
  encoding data units that are buffered by at least one of the second de-multiplexing units, thereby to record program contents of a second channel.

14. The digital broadcast receiving method of claim 13, wherein the first channel and the second channel correspond to different frequency points of the broadcast signal.

* * * * *